L. H. FLANDERS.
STORAGE BATTERY.
APPLICATION FILED FEB. 23, 1905.
943,345. Patented Dec. 14, 1909.
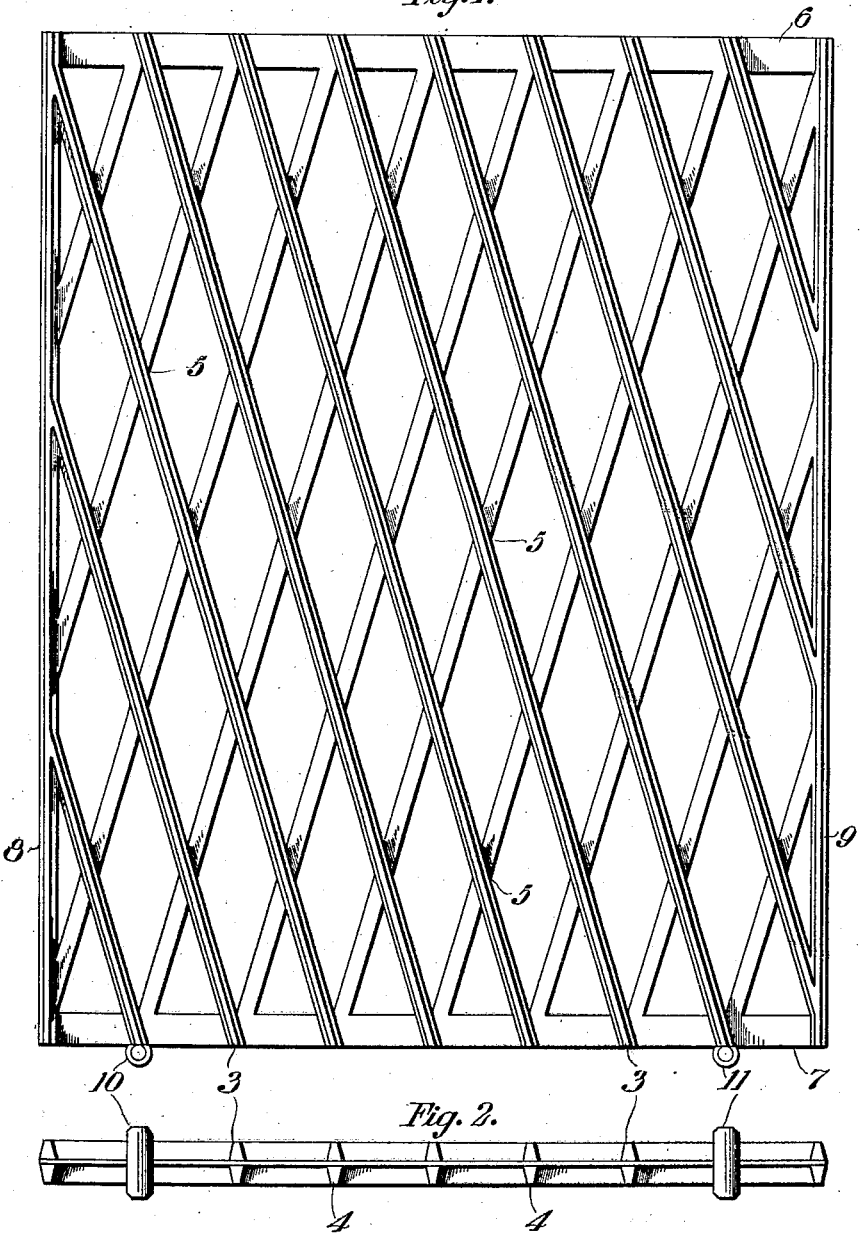

UNITED STATES PATENT OFFICE.

LOUIS H. FLANDERS, OF WILKINSBURG, PENNSYLVANIA, ASSIGNOR, BY MESNE ASSIGNMENTS, TO WESTINGHOUSE STORAGE BATTERY COMPANY, A CORPORATION OF NEW YORK.

STORAGE BATTERY.

943,345. Specification of Letters Patent. Patented Dec. 14, 1909.

Application filed February 23, 1905. Serial No. 246,941.

*To all whom it may concern:*

Be it known that I, LOUIS H. FLANDERS, a citizen of the United States, and a resident of Wilkinsburg, in the county of Allegheny and State of Pennsylvania, have invented a new and useful Improvement in Storage Batteries, of which the following is a specification.

This invention relates to secondary batteries, and more particularly to separators for such batteries.

In secondary batteries in which the elements are designed and assembled to occupy a minimum amount of space, short circuiting of the batteries is liable to occur between the electrodes or plates, due to intercontact caused by buckling or bending. For this reason, insulating separators are interposed between the plates. In such batteries, short circuiting also occurs through what is known as "bridging of active material." This is caused by an electrolytically deposited chain, of some conducting salt or metal, connecting the electrodes. This deposition is usually formed on the surface of some interposed or adjacent insulating body.

The object of this invention is to produce a separator of simple and rigid construction that shall effectively insulate the electrodes.

A further object of this invention is the production of a separator occupying a minimum amount of space, and which will prevent the bridging of active material.

These and other objects I attain in a separator embodying the features herein described and illustrated.

In the single sheet drawing accompanying this application and forming a part thereof, Figure 1 is a side view of a separator composed of inclined spacing ribs mounted on a rectangular binding frame: Fig. 2 is an end view of such a separator.

The separator consists of inclined insulating ribs connected by an upper and lower binding strap and lateral mounting pieces. Parallel inclined ribs are connected to one side of the binding straps and form one half of the separator. The set of oppositely inclined parallel ribs are connected to the other side of the binding strap and form the other half of the separator. The oppositely inclined ribs are connected at their intersection, and those terminating in the lateral binding pieces are connected to such binding pieces.

Referring to the figures: The individual ribs composing the oppositely inclined sets 3 and 4 are half the width of the separator and are connected at 5, their points of intersection. These ribs are preferably of prismoidal form, as a rib of this shape presents a rigid resistance to bending, and is also conveniently handled in the operation of constructing the separator. Top and bottom binding straps 6 and 7 are connected to the ends of the individual members in each set of inclined ribs. The lateral mounting pieces 8 and 9 are rigidly connected to the top and bottom binding straps 6 and 7, and also to the ends of the inclined ribs which terminate in them. This combination of crossed rib construction with the top and bottom binding straps and the lateral mounting pieces, produces a strong and rigid separator, capable of preventing motion in the plates and a consequent breaking of the lugs when the cells are subjected to vibrations and jars. The interposition of the numerous rigid points of separation secured by the intersection of the two sets of inclined ribs insures perfect separation, and prevents bending or buckling in the plates.

Short circuiting through bridging of the active material along a ribbed surface, cannot take place, since the portion of the separator in contact with one plate is not in contact with the opposite plate, as the ribs on one side of the separator only extend half way into the space between the two plates, and therefore no opportunity is presented for the lodgment of active material on the separator. The inclination of the ribs also tends to decrease the tendency of bridging, as active material lodging on the ribs slides down and drops off the separator into the bottom of the containing vessel.

In order that the separator cannot rise, due to its tendency to float in the electrolyte, I have provided hooks or projections 10 and 11, which are connected to the bottom binding strap 7. These hooks project under the bottoms of the electrodes and hold the separators in normal position. The bottom binding straps hold the separators in place upon the bridges or lugs with which the containing jar is provided, and prevent them from dropping into the "mud cellar" or the bottom of the jar.

The individual members of the separator may be made of any suitable insulating material, and by vulcanizing or otherwise, suitably connected together.

What I claim is:—

1. A separator comprising superimposed and diagonally extending intersecting members provided with a binding and mounting frame, each diagonal member being approximately one-half the thickness of the frame.

2. A separator comprising superimposed and diagonally extending intersecting members provided with an integrally formed binding and mounting frame, each diagonally extending member being one-half the thickness of the frame.

3. A separator comprising superimposed and diagonally extending intersecting members provided with a binding or mounting frame comprising flanged members and relatively thin end binding strips formed between the ends of the superimposed members.

4. A separator comprising superimposed obliquely extending and intersecting members and a binding or mounting frame comprising laterally formed members provided with integrally formed holding lugs located between the ends of the superimposed members.

In testimony whereof, I have hereunto subscribed my name this 20th day of February, 1905.

LOUIS H. FLANDERS.

Witnesses:
　DAVID WILLIAMS,
　CHARLES W. McGHEE.